(12) United States Patent
Yang

(10) Patent No.: US 8,537,116 B2
(45) Date of Patent: Sep. 17, 2013

(54) COMPUTER MOUSE HAVING REMOTE CONTROL

(75) Inventor: Xin Yang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 104 days.

(21) Appl. No.: 13/217,265

(22) Filed: Aug. 25, 2011

(65) Prior Publication Data

US 2012/0287045 A1 Nov. 15, 2012

(30) Foreign Application Priority Data

May 13, 2011 (CN) .......................... 2011 1 0123429

(51) Int. Cl.
*G06F 3/033* (2013.01)
*G09G 5/00* (2006.01)
*H05K 7/00* (2006.01)

(52) U.S. Cl.
USPC ........... 345/163; 345/156; 345/157; 345/169; 361/679.1; 361/679.4; 361/679.18; 361/679.01

(58) Field of Classification Search
USPC ......... 345/156–170; 455/575, 566; 341/173; 257/E25.032, E27.127; 348/14.05; 361/679.01–679.55; 710/62; 381/334
See application file for complete search history.

(56) References Cited

U.S. PATENT DOCUMENTS

| 4,917,516 | A | * | 4/1990 | Retter | 400/489 |
|---|---|---|---|---|---|
| 6,466,154 | B1 | * | 10/2002 | Kim et al. | 341/176 |
| 6,580,420 | B1 | * | 6/2003 | Wang | 345/163 |
| 6,690,359 | B1 | * | 2/2004 | Felton | 345/163 |
| 7,619,613 | B2 | * | 11/2009 | Lin et al. | 345/163 |
| 8,081,160 | B2 | * | 12/2011 | Cheng et al. | 345/163 |
| 2002/0095535 | A1 | * | 7/2002 | Blood | 710/62 |
| 2002/0190952 | A1 | * | 12/2002 | Shah | 345/163 |
| 2003/0214484 | A1 | * | 11/2003 | Haywood | 345/163 |
| 2004/0075642 | A1 | * | 4/2004 | Kisliakov | 345/156 |
| 2004/0227695 | A1 | * | 11/2004 | Schedivy | 345/7 |
| 2006/0152491 | A1 | * | 7/2006 | Lian | 345/166 |
| 2006/0176277 | A1 | * | 8/2006 | Daniel et al. | 345/163 |
| 2006/0210105 | A1 | * | 9/2006 | Liao | 381/334 |
| 2006/0244726 | A1 | * | 11/2006 | Wang et al. | 345/163 |
| 2007/0109272 | A1 | * | 5/2007 | Orsley et al. | 345/173 |
| 2007/0159463 | A1 | * | 7/2007 | Huang | 345/163 |
| 2007/0205981 | A1 | * | 9/2007 | Stone, III | 345/156 |
| 2008/0002340 | A1 | * | 1/2008 | Chatterjee et al. | 361/679 |
| 2008/0186277 | A1 | * | 8/2008 | Wang | 345/163 |
| 2008/0261659 | A1 | * | 10/2008 | Jang et al. | 455/566 |

* cited by examiner

*Primary Examiner* — Dwayne Bost
*Assistant Examiner* — Darlene M Ritchie
(74) *Attorney, Agent, or Firm* — Altis & Wispro Law Group, Inc.

(57) ABSTRACT

An exemplary computer mouse includes a main body and a remote control. The main body includes a receiving cavity for receiving the remote control. The receiving cavity has two opposite sidewalls. Each of the two opposite sidewalls defines a first recess, a second recess, and a third recess. The first recess is located between the second recess and the third recess and is separated from the second recess and the third recess. The remote control includes a first sidewall and a second sidewall. Each of the first and second sidewalls of the remote control includes a first protruding post and a second protruding post. Each of the first protruding posts is latched in the corresponding second recess or the corresponding third recess to fix the remote control in the receiving cavity. Each of the second protruding posts slides in the corresponding first recess to make the remote control rotatable.

11 Claims, 6 Drawing Sheets

COMPUTER MOUSE HAVING REMOTE CONTROL

BACKGROUND

1. Technical Field

The present disclosure relates to a computer mouse, and particularly, to a computer mouse with a remote control function.

2. Description of Related Art

Many televisions have wireless network functions. Usually, a computer mouse is used for controlling the motion of a cursor in two dimensions in a graphical interface on the television when the television is used as a computer. When a TV program is being watched, a remote control is needed to change channels or adjust the volume.

However, after the computer mouse or the remote control is used, the computer mouse or the remote control is stored in a certain location. When the computer mouse or the remote control needs to be used again, it can some times take extra time to find the computer mouse or the remote control. Accordingly, it is very inconvenient for user to use.

Therefore, what is needed is a new computer mouse that can overcome the described limitations.

DETAILED DESCRIPTION

Figure 1:
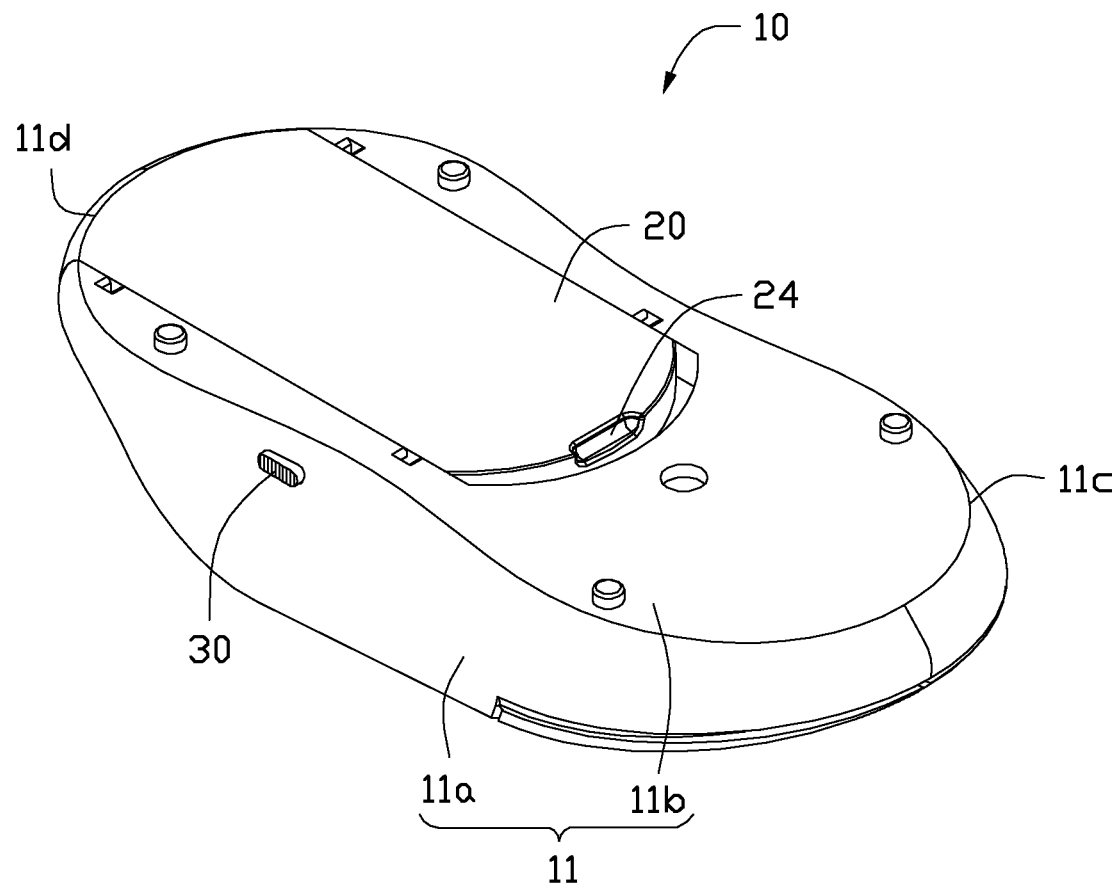
FIG. 1 is an isometric view of a computer mouse according to an exemplary embodiment.
Figure 2:
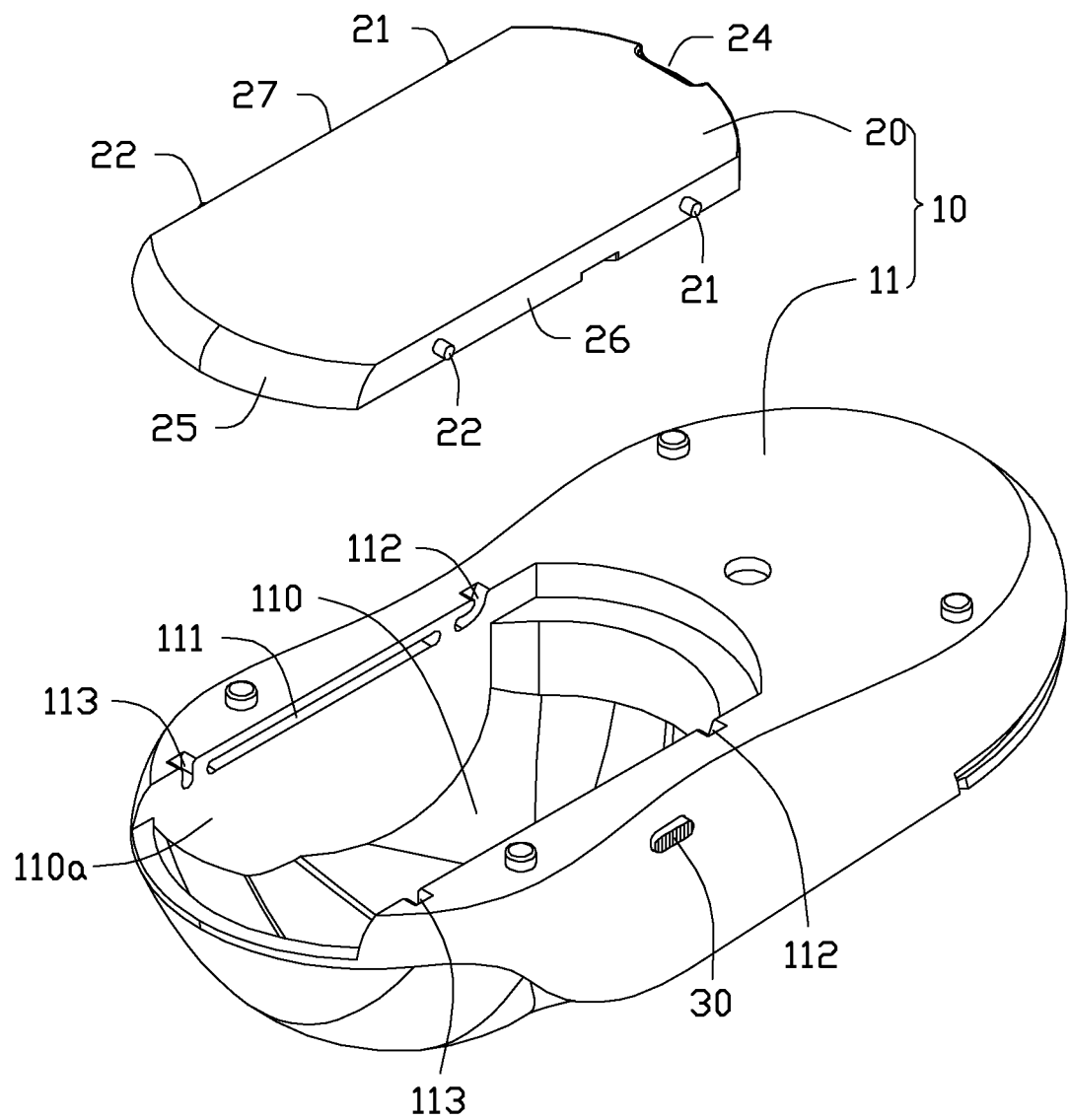
FIG. 2 is an explored isometric view of the computer mouse of FIG. 1.
Figure 3:
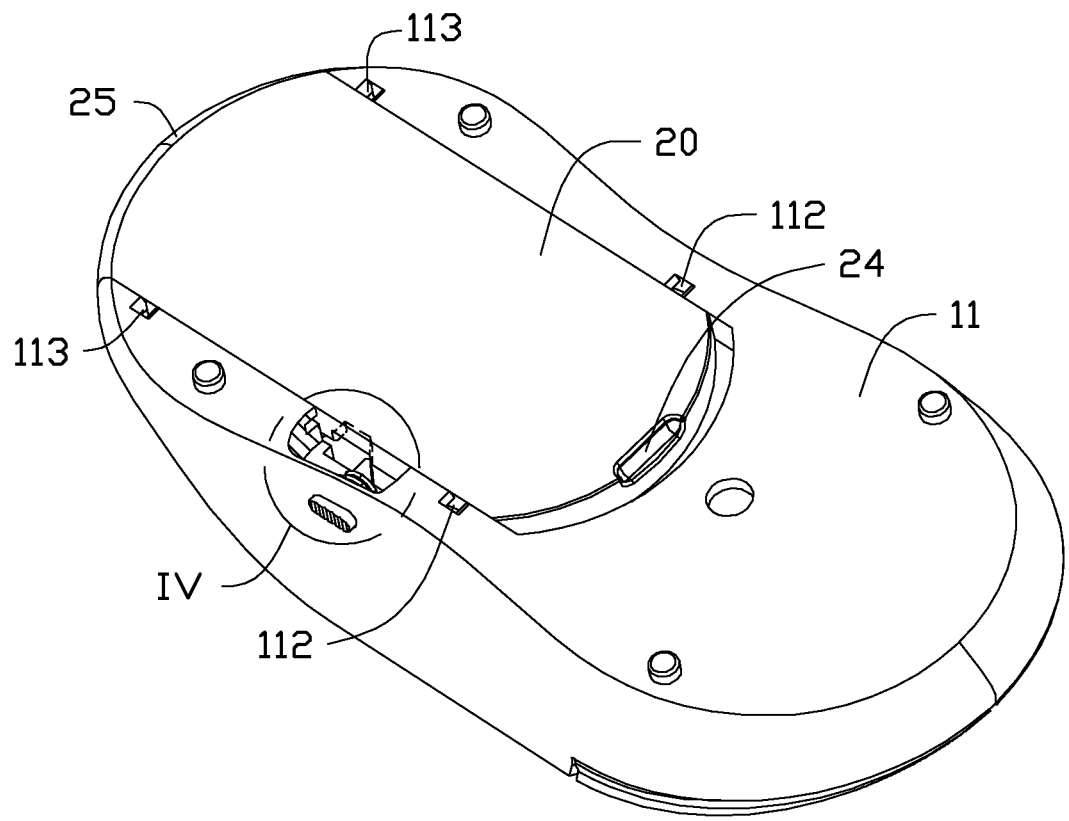
FIG. 3 is a partially sectional view of the computer mouse of FIG. 1.
Figure 4:
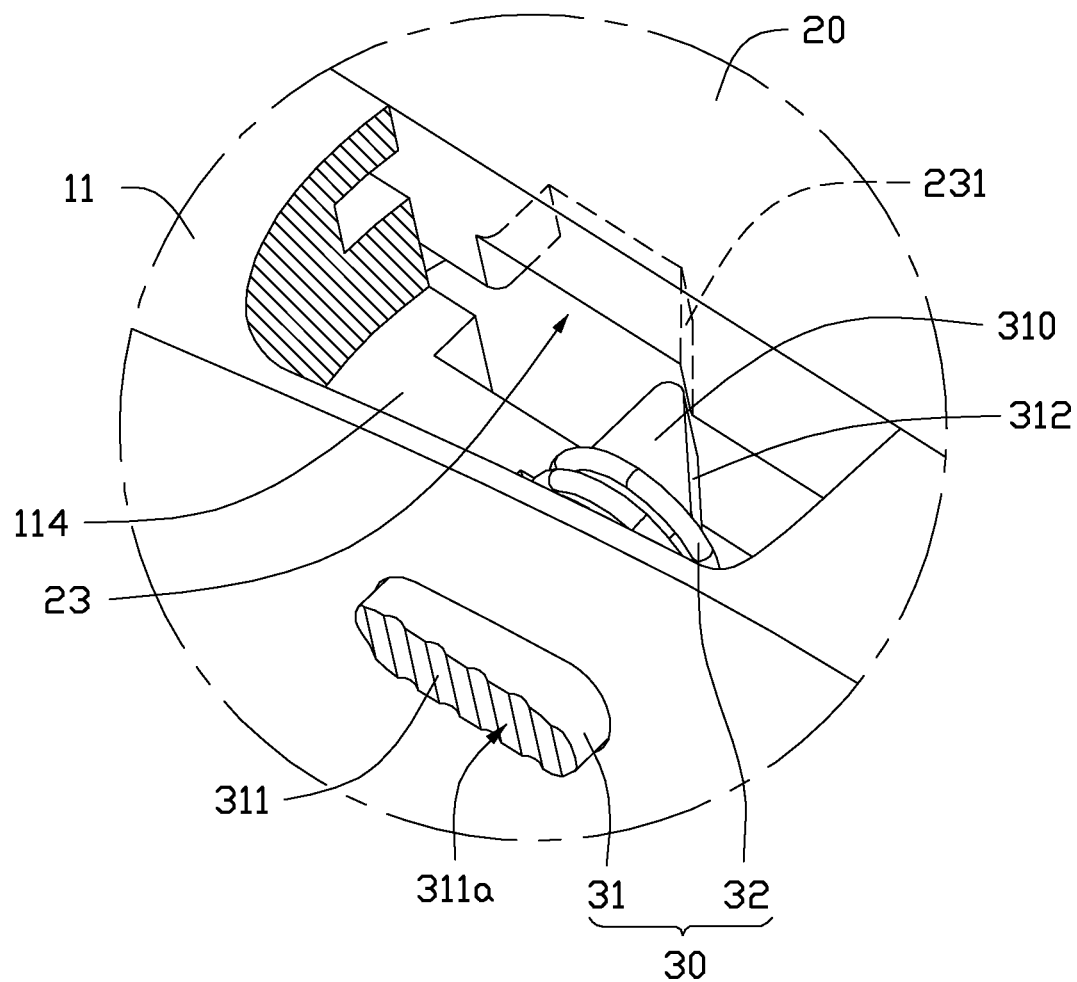
FIG. 4 is an enlarged view of the circled portion IV of FIG. 3.

Embodiments will now be described in detail with reference to the drawings.

Referring to FIGS. 1 through 4, a computer mouse 10, in accordance with an exemplary embodiment, is shown. The computer mouse 10 includes a main body 11, a remote control 20 received in the main body 11, and a key 30 positioned on the main body 11.

The main body 11 includes a shell 11a, and a bottom base 11b latched or otherwise secured to the shell 11a. The shell 11a and a front end 11c of the bottom base 11b cooperatively define a receiving cavity (not shown) for receiving a circuit board. The main body 11 also has a plurality of common structures (not shown) (i.e. left button, right button, roller, etc) electrically coupled to the circuit board for achieving computer mouse functions. In the present embodiment, the main body 11 is a wired computer mouse. In other embodiments, the main body 11 may be a wireless computer mouse.

A back end 11d of the bottom base 11b defines a receiving cavity 110 for receiving the remote control 20. Each of the two opposite sidewalk 110a of the receiving cavity 110 defines a first recess 111, a second recess 112, and a third recess 113. The first recess 111 is located between the second recess 112 and the third recess 113, and they are separated from each other. The first recess 111 is a bar-shaped recess and extends along a direction substantially parallel to the bottom base 11b. The second recess 112 is an arcuate recess and curves away from the first recess 111. One end of the second recess 112 is close to the first recess 111 and positioned in an extending direction of the first recess 111. The other end of the second recess 112 extends through the bottom base 11b. The extending direction of the third recess 113 is substantially perpendicular to an longitudinal direction of the first recess 111 (i.e. the third recess 113 is substantially perpendicular to the first recess 111).

A through hole 114 communicating with the receiving cavity 110 is defined in the main body 11 for receiving the key 30.

The key 30 includes a push button 31 and a spring 32. The push button 31 includes a pressing portion 311 and a latch tongue 310 extending from the pressing portion 311. The latch tongue 310 has a first inclined surface 312. The spring 32 is a coil spring and placed over the latch tongue 310. In the present embodiment, the surface 311a of the pressing portion 311 is a rough surface for convenient operation. In other embodiments, there may be a recess or a protrusion on the surface 311a of the pressing portion 311 for convenient operation.

The remote control 20 has a plurality of structures (not shown) (i.e. control buttons, circuit board) for achieving remote control functions. The remote control 20 includes an emitter end 24, a distal end 25 opposite to the emitter end 24, a first sidewall 26 facing the key 30, and a second sidewall 27 opposite to the first sidewall 26. The emitter end 24 emits infrared light to achieve remote control functions. The first sidewall 26 and the second sidewall 27 connect the emitter end 24 to the distal end 25.

Each of the first sidewall 26 and the second sidewall 27 includes a first protruding post 21 and a second protruding post 22. The first protruding post 21 is latched in the second recess 112 or the third recess 113 for fixing the remote control 20 in the receiving cavity 110, such that the remote control 20 can be fixed in the main body 11 when needed. The second protruding post 22 is received in first recess 111, and can slide along the first recess 111. In addition, a notch 23 is defined in the first sidewall 26. The notch 23 has a second inclined surface 231 for engaging with the first inclined surface 310 of the latch tongue 312 to push the remote control 20 to move towards the second recess 112 along a direction substantially parallel to the first recess 111.

Figure 5:
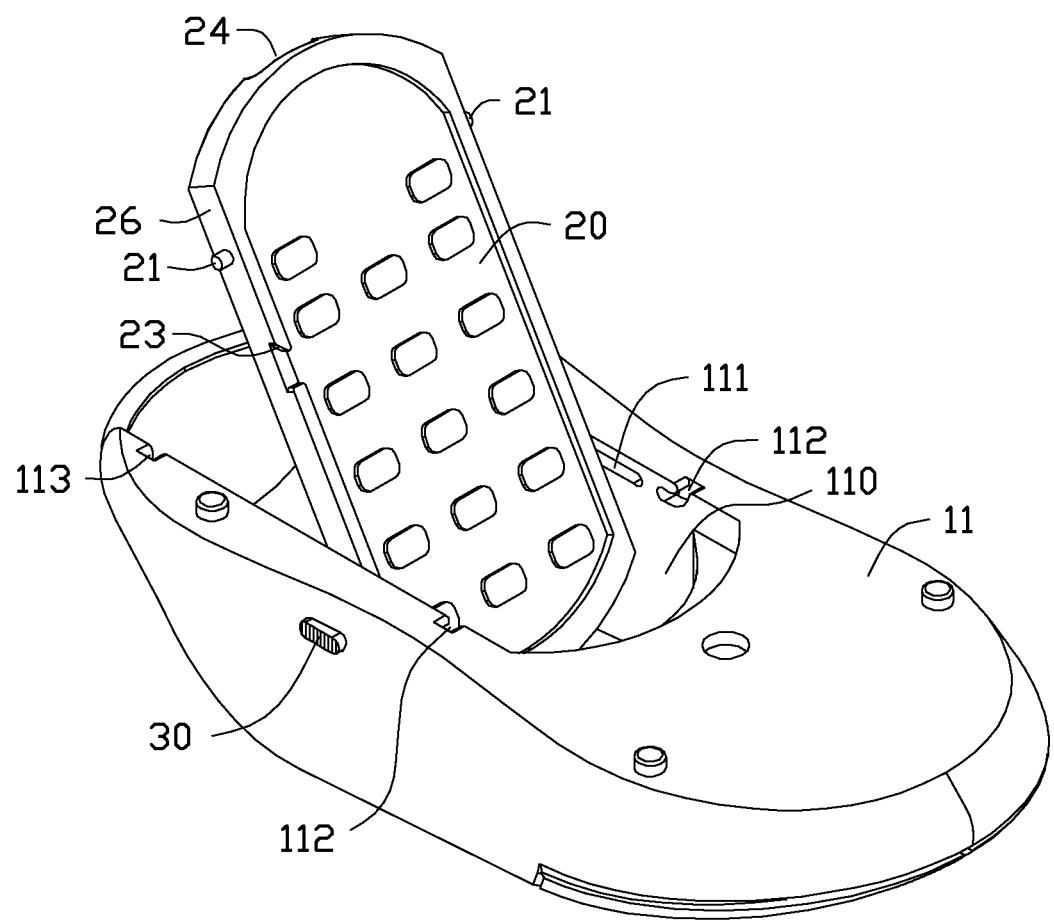
FIG. 5 is an isometric view of a remote control of the computer mouse of FIG. 1.
Figure 6:
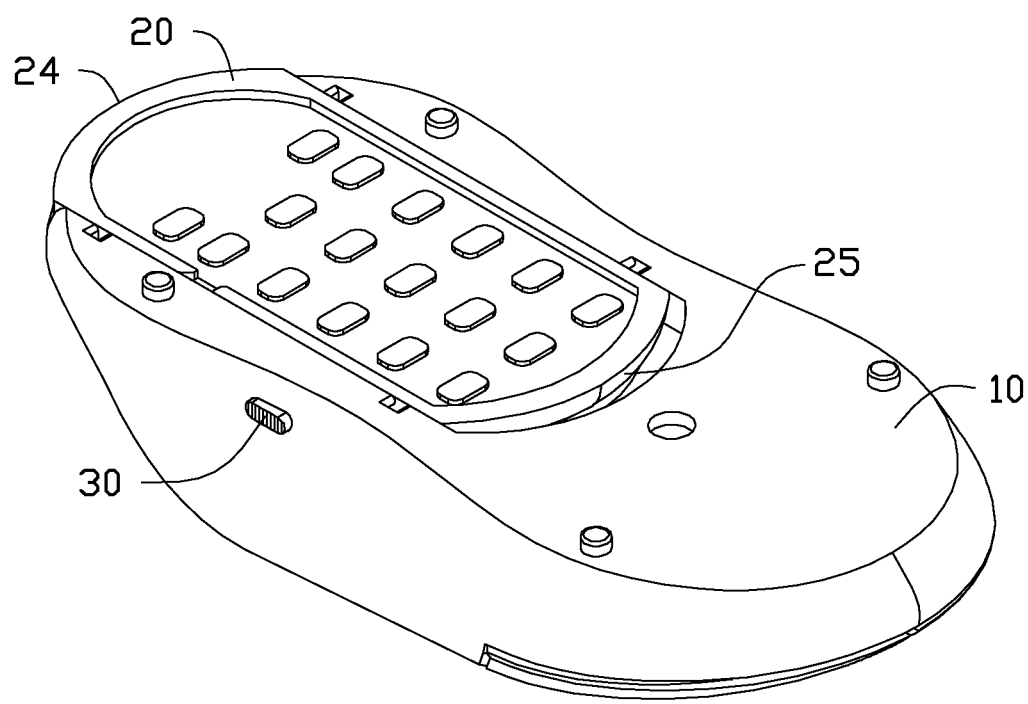
FIG. 6 is similar to FIG. 5, but view from another aspect.

Referring back to FIG. 1, when the back surface (i.e. a surface without control buttons), of the remote control 20 faces outside (see FIG. 1), each of two second protruding posts 22 is located in a back end of the corresponding first recess 110, and each of two first protruding posts 21 is located in the corresponding second recess 112 and close to the first recess 111, such that the emitter end 24 is received in the receiving cavity 110. When using the remote control 20, the push button 31 is first pushed, such that the first inclined surface 312 of the latch tongue 310 contacts with the second inclined surface 231. When the push button 31 continues to be pushed, the latch tongue 310 contacts with different positions of the second inclined surface 231, and the remote control 20 is pushed, such that the second protruding, posts 22 slide in the respective first recesses 111 towards the second recess 112, the first protruding posts 21 slide out of the respective second recesses 112, and the emitter end 24 slightly protrudes out of the receiving cavity 110. Next, the push button 31 is released, and returns to its original position under the help of the spring 32, such that the latch tongue 310 is separated from the second inclined surface 231. In such case, the remote control 20 will be rotated by hand. With the rotation of the remote control 20, the emitter end 24 totally protrudes out of the receiving cavity 110 (see FIG. 5). The remote control 20 is continued to be rotated by hand, such that the first protruding posts 21 are latched in the respective third recesses 113, and the second protruding posts 22 reach the front end of the respective first recesses 111. In such case, the front surface (i.e. a surface with the operation buttons formed thereon) of the remote control 20 totally faces outside, and the emitter end 24 faces outside (see FIG. 6). By operating the operation buttons, the function of the remote control 20 can be achieved.

When there is no need to use the remote control 20, the remote control 20 is pulled apart from the bottom base 10, such that the first protruding posts 21 separate from the respective third recesses 113, and the second protruding posts 22 slide in the respective first recesses 111. When the front surface of the remote control 20 faces the receiving cavity 110, the first protruding posts 21 are latched in the respective second recesses 112. Each of the second protruding posts 22 is located at the back end of the corresponding first recess 111, such that the remote control 20 is fixed in the receiving cavity 110, and the back surface of the remote control 20 and the bottom base 11b are on the same plane. In such case, by operating the main body 11, the computer mouse functions can be achieved.

While certain embodiments have been described and exemplified above, various other embodiments will be apparent from the foregoing disclosure to those skilled in the art. The disclosure is not limited to the particular embodiments described and exemplified but is capable of considerable variation and modification without departure from the scope and spirit of the appended claims.

What is claimed is:

1. A computer mouse having a remote control, comprising:
    a main body, the main body defining a receiving cavity, the receiving cavity having two opposite sidewalls, each of the two opposite sidewalk defining a first recess, a second recess, and a third recess, the first recess being located in line between the second recess and the third recess and separated from the second recess and the third recess; and
    a remote control received in the receiving cavity, the remote control comprising a first sidewall and a second sidewall opposite to the first sidewall, each of the first and second sidewalls of the remote control comprising a first protruding post and a second protruding post, each of the first protruding posts being received in a corresponding second recess and capable of sliding out of the corresponding second recess, each of the second protruding posts sliding in a corresponding first recess, the remote control capable of being moved in a direction towards the second recesses to cause each of the first protruding posts to slide out of the corresponding second recess, and then being rotated about the first protruding post to turn around such that each of the first protruding posts is received in a corresponding third recess.

2. The computer mouse of claim 1, wherein each of the first recesses is a bar-shaped recess, each of the second recesses is an arcuate recess, and the third recess is substantially perpendicular to the first recess.

3. The computer mouse of claim 2, further comprising a key positioned on the main body, wherein the remote control comprises a first inclined surface, the key is configured to push the inclined surface to make the remote control slide along the first recesses towards the second recesses.

4. The computer mouse of claim 3, wherein the main body defines a through hole receiving the key.

5. The computer mouse of claim 4, wherein the key comprises a push button and a spring, the push button passes through the through hole, the spring is sleeved over the push button.

6. The computer mouse of claim 5, wherein the push button comprises a latch tongue having a second inclined surface, the second inclined surface contacts with the first inclined surface when the key is pushed.

7. The computer mouse of claim 6, wherein the push button comprises a pressing portion, the latch tongue extends from the pressing portion, and a surface of the pressing portion is a rough surface for convenient operation.

8. The computer mouse of claim 1, wherein the main body comprises a shell and a bottom base secured on the shell, and the receiving cavity is defined in the bottom base.

9. The computer mouse of claim 8, wherein each first recess is a bar-shaped recess and extends along a direction substantially parallel to the bottom base; each second recess is an arcuate recess and curves away from a respective one of the first recesses, one end of each second recess is close to the respective first recess and positioned in an longitudinal direction of the respective first recess, and the other end of each second recess extends through the bottom base.

10. The computer mouse of claim 8, wherein the main body defines a through hole; the remote control defines a notch in one of the first and second sidewalls, the notch has a first inclined surface; the computer mouse comprises a key, the key comprises a push button and a spring, the push button comprises a latch tongue passing through the through hole, the latch tongue has a second inclined surface, the spring is sleeved over the latch tongue; the second inclined surface contacts with the first inclined surface when the key is pushed.

11. The computer mouse of claim 10, wherein the push button comprises a pressing portion, the latch tongue extends from the pressing portion, and a surface of the pressing portion is a rough surface for convenient operation.

* * * * *